(12) United States Patent
Cheng et al.

(10) Patent No.: US 8,228,673 B2
(45) Date of Patent: Jul. 24, 2012

(54) ELECTRONIC DEVICE

(75) Inventors: Yung-Fa Cheng, Taipei Hsien (TW); Hsiang-Lung Kao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 194 days.

(21) Appl. No.: 12/788,219

(22) Filed: May 26, 2010

(65) Prior Publication Data
US 2011/0128678 A1 Jun. 2, 2011

(30) Foreign Application Priority Data

Nov. 27, 2009 (CN) .......................... 2009 1 0310596

(51) Int. Cl.
*G06F 1/16* (2006.01)
(52) U.S. Cl. .................................... 361/679.55; 345/173
(58) Field of Classification Search ............. 361/679.55, 361/679.01; 345/173
See application file for complete search history.

(56) References Cited

U.S. PATENT DOCUMENTS

| 5,115,374 | A | * | 5/1992 | Hongoh | 361/679.09 |
| 5,386,298 | A | * | 1/1995 | Bronnenberg et al. | 358/403 |
| 5,479,269 | A | * | 12/1995 | Bronnenberg et al. | 358/403 |
| 6,392,871 | B1 | * | 5/2002 | Yanase | 361/679.07 |
| 7,035,665 | B2 | * | 4/2006 | Kido et al. | 455/566 |
| 7,453,440 | B2 | * | 11/2008 | Sun | 345/168 |
| D621,826 | S | * | 8/2010 | Cheng et al. | D14/327 |
| D621,827 | S | * | 8/2010 | Cheng et al. | D14/327 |
| D621,828 | S | * | 8/2010 | Cheng et al. | D14/327 |
| 7,864,524 | B2 | * | 1/2011 | Ladouceur et al. | 361/679.55 |
| 8,081,446 | B2 | * | 12/2011 | Hsu | 361/679.55 |
| 2011/0074709 | A1 | * | 3/2011 | Cheng et al. | 345/173 |

* cited by examiner

*Primary Examiner* — Lisa Lea Edmonds
(74) *Attorney, Agent, or Firm* — Altis Law Group, Inc.

(57) ABSTRACT

An electronic device includes a main body, a lid, and a connecting component. The lid is rotatably connected to the main body. The connecting component includes at least one interface. The at least one interface can be hidden by the lid when the lid covers the main body, and exposed when the lid rotates away from the main body.

17 Claims, 4 Drawing Sheets

ELECTRONIC DEVICE

BACKGROUND

1. Technical Field

The present disclosure relates to electronic devices, and particularly to an electronic device with at least one interface.

2. Description of Related Art

A notebook computer commonly has several interfaces arranged in its sidewalls for electrically connecting peripheral devices. However, when the interfaces are not in use, they accumulate dust and grime and made prove unreliable when in use.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the two views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
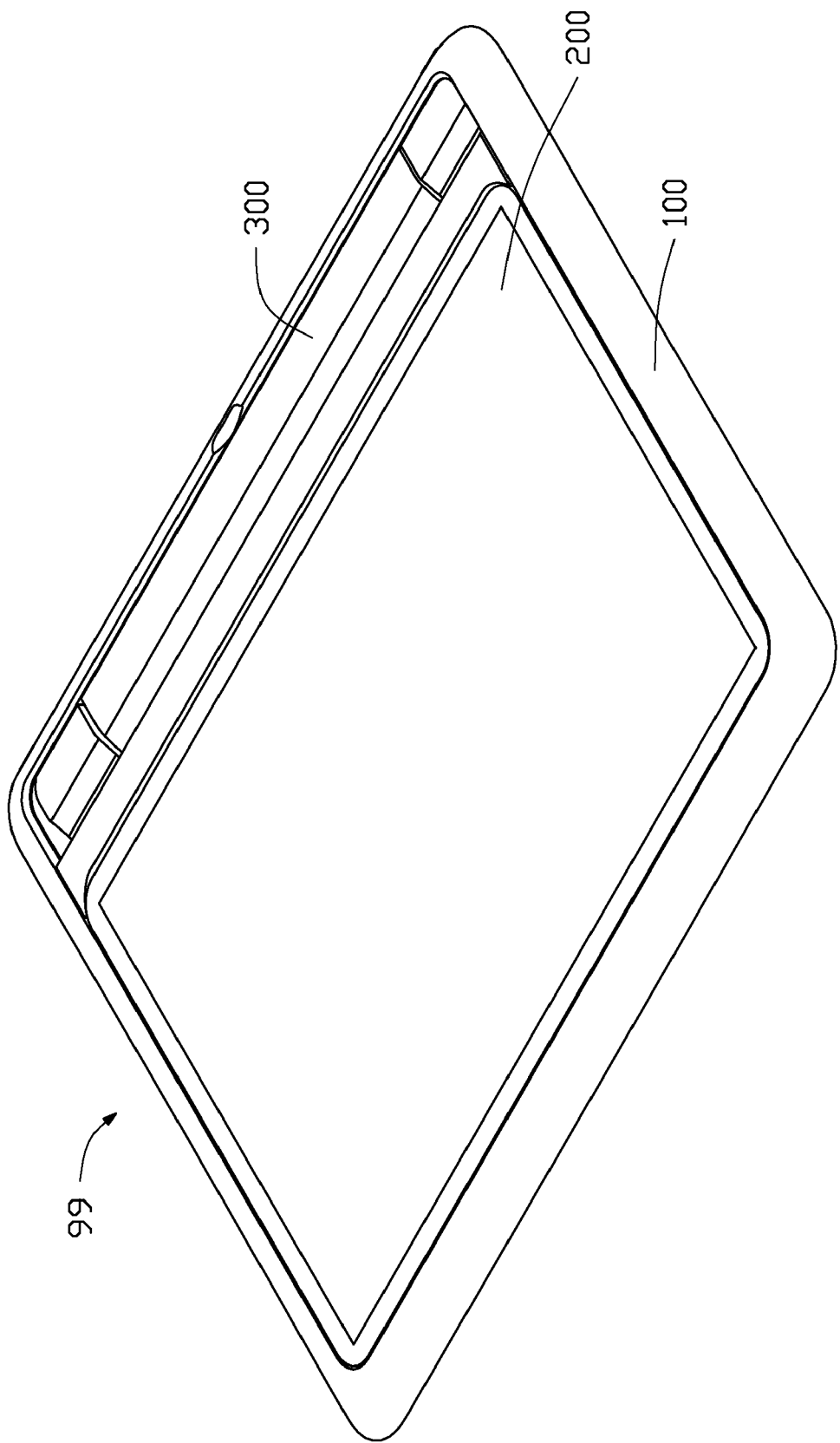
FIG. 1 is a perspective view of an electronic device in accordance with an exemplary embodiment.
Figure 2:
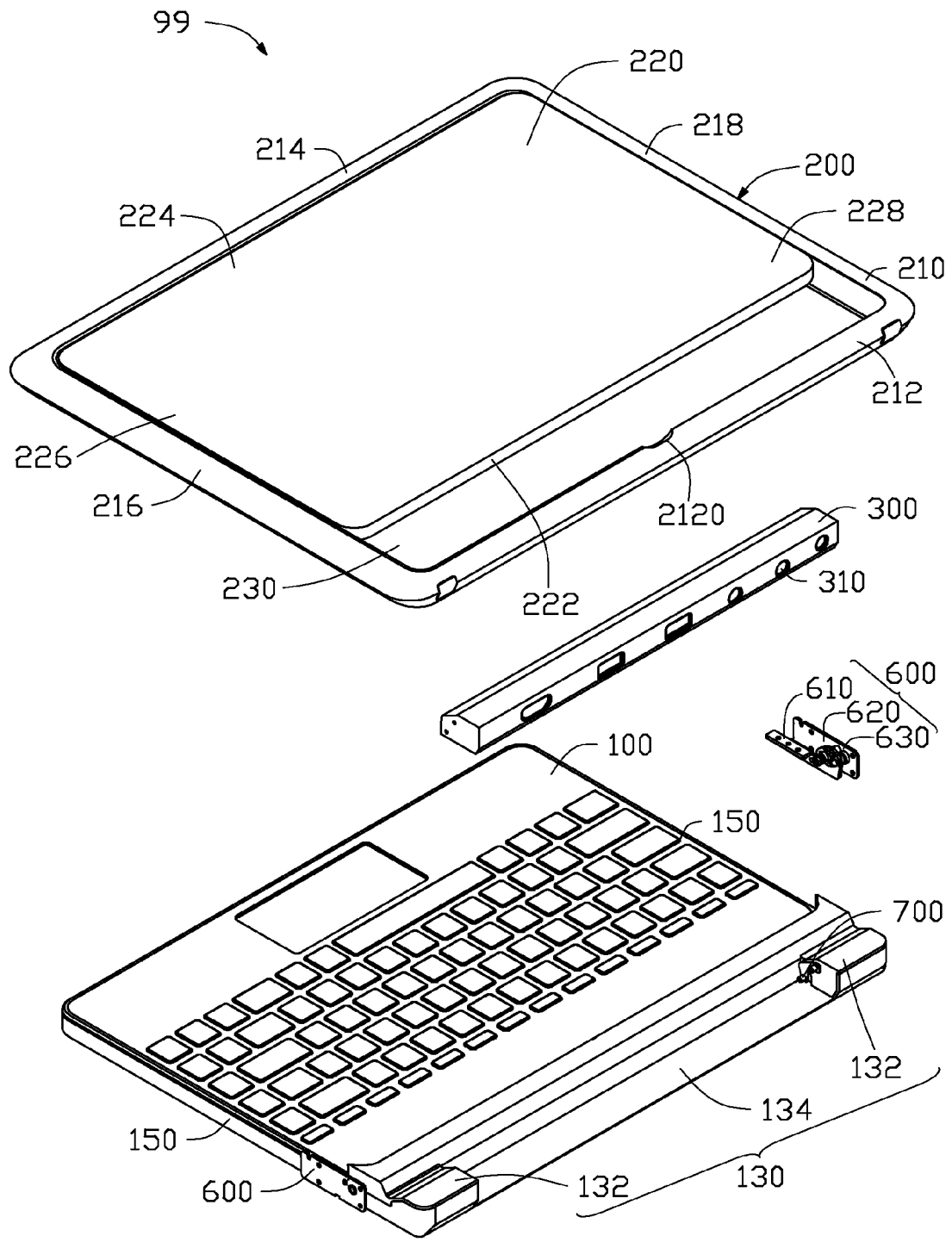
FIG. 2 is an exploded view of the electronic device of FIG. 1.

Referring to FIGS. 1 and 2, an electronic device 99 includes a main body 100, a lid 200 and a connecting component 300. The electronic device 99 may be a notebook computer, or an optical disc player.

The main body 100 includes a side part 130, and two sidewalls 150 extending from opposite ends of the side part 130 in the same direction. The two sidewalls 150 are substantially perpendicular to the side part 130. The side part 130 includes two shaft retainers 132 and a receiving space 134 defined between the two shaft retainers 132.

The connecting component 300 is strip shaped. The connecting component 300 includes a plurality of interfaces 310 for electrically connecting peripheral devices. Opposite ends of the connecting component 300 rotatably connect with the two shaft retainers 132 respectively through two hinges 700, thus the connecting component 300 is capable of rotating with respect to the main body 100. At the same time, the connecting component 300 is received in the receiving space 134.

The lid 200 includes a frame 210 and a display 220 received in the frame 210. The frame 210 includes a first beam 212, a second beam 214, a third beam 216, and a fourth beam 218. The first beam 212, the third beam 216, the second beam 214, and the fourth beam 218 substantially perpendicularly interconnect with each other in the same order given here to form the frame 210. The first beam 212 defines a recess 2120.

The display 220 is thinner than the frame 210. The display 220 includes a first rim 222, a second rim 224, a third rim 226, and a fourth rim 228. The first rim 222, the third rim 226, the second rim 224, and the fourth rim 228 are substantially perpendicularly interconnected in the same order given here. The second rim 224, the third rim 226, and the fourth rim 228 are fastened with the second beam 214, the third beam 216, and the fourth beam 218 respectively to fasten the display in the frame 210. The first rim 222 is parallel to the first beam 212, and combines the first beam 212, the third beam 216, and the fourth beam 218 to define an opening 230.

The electronic device 99 further includes two hinges 600 for rotatably connecting the main body 100 to the lid 200. Each hinge 600 includes a first fastening portion 610, a second fastening portion 620, and a shaft 630 connected between the first fastening portion 610 and the second fastening portion 620. The two first fastening portions 610 extend through the two sidewalls 150 respectively to fasten in the main body 100. The two second fastening portions 620 are fastened on the third beam 216 and the fourth beam 218 of the frame 210 respectively. Therefore, the lid 200 is capable of rotating with respect to the main body 100.

At the same time, the display 220 of the lid 200 covers the main body 100. The frame 210 sleeves on the main body 100. The side part 130 and the connecting component 300 are received in the opening 230. The third beam 216 and the fourth beam 218 are adjacent to the two sidewalls 150 respectively. The first beam 212 covers the interfaces 310 to prevent contaminants such as dust from penetrating into the interfaces 310.

Figure 3:
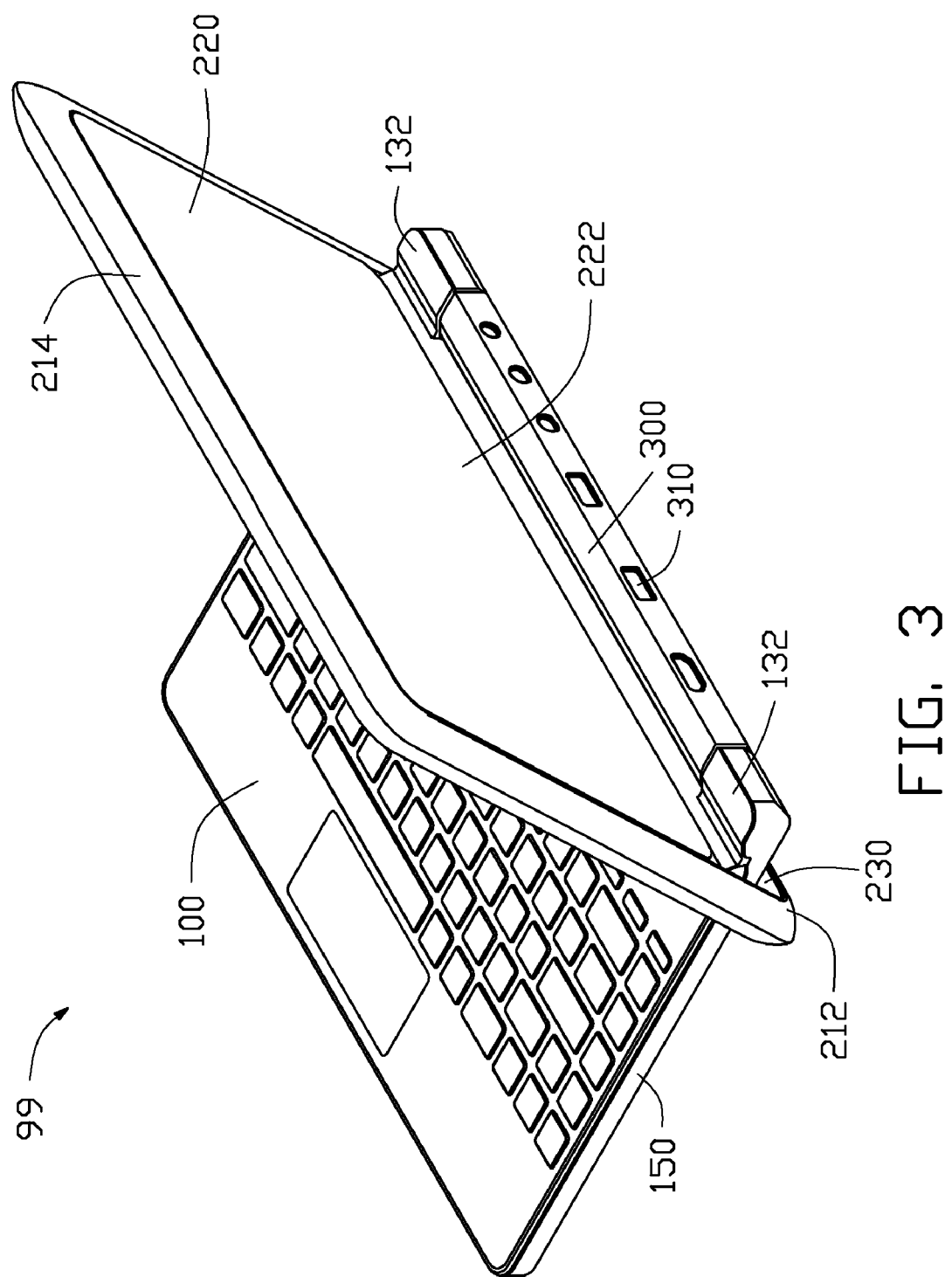
FIG. 3 is a schematic view of the electronic device of FIG. 1 in a first state.

Referring to FIG. 3, in use, the lid 200 rotates away from the main body 100 via the hinges 600. The second beam 214 of the frame 210 and the display 220 are disposed on the side part 130 of the main body 100. The first beam 212 is disposed under the main body 100, and combines with parts of the third beam 216 and the fourth beam 218 under the main body 100 to form a bracket for supporting the main body 100. It is convenient that the main body 100 dissipates heat. At the same time, the interfaces 310 of the connecting component 300 are exposed, thus the peripheral devices are conveniently connectable to the electronic device 99.

Figure 4:
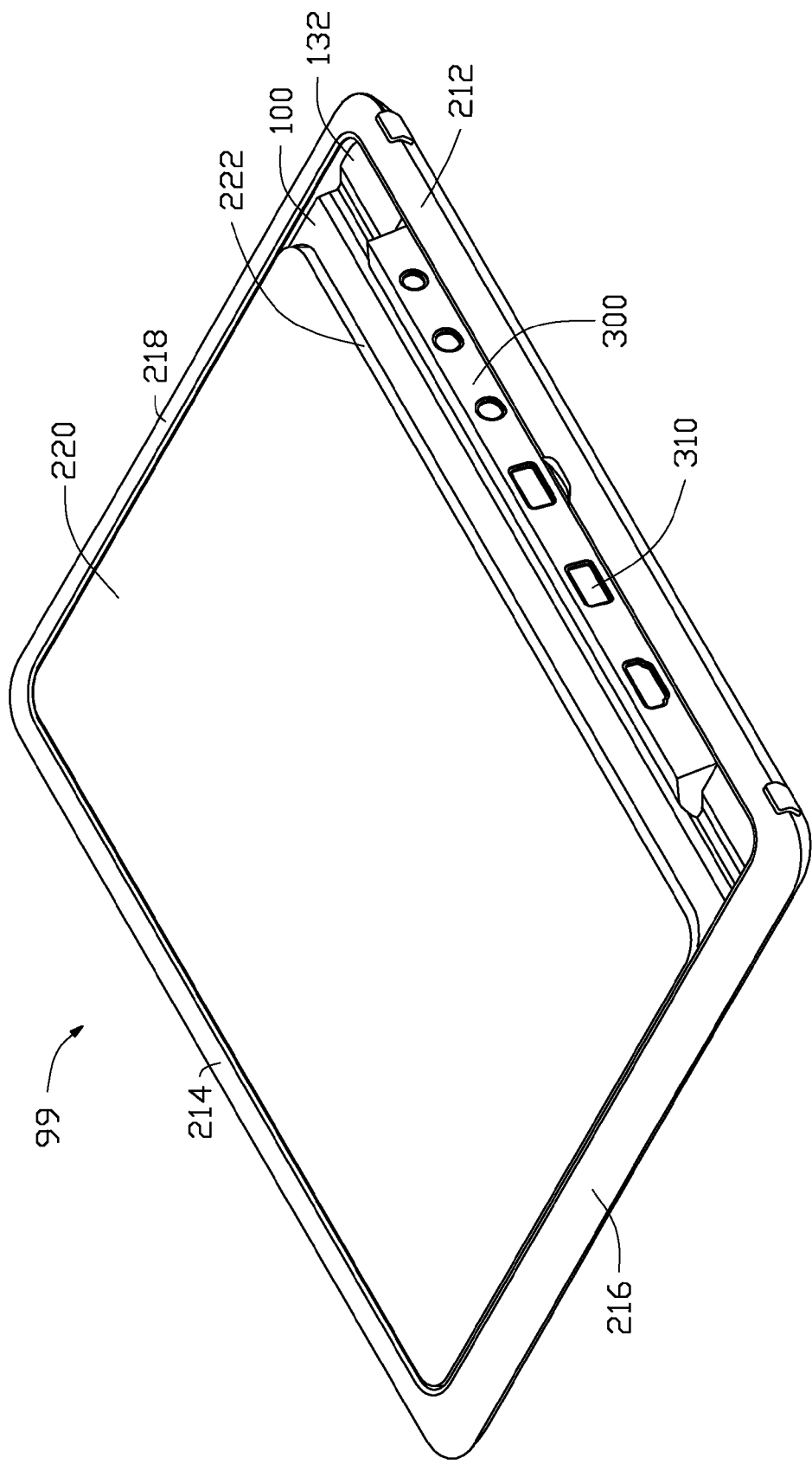
FIG. 4 is a schematic view of the electronic device of FIG. 1 in a second state.

Referring to FIG. 4, if a user needs to use the interfaces 310 of the connecting component 300 to connect a peripheral device, such as a speaker, to the electronic device 99 to listen to music, but does not need or want to use the display 220, the user can retain the lid 200 to cover the main body 100, and rotate the connecting component 300 until the interfaces 310 are exposed. In addition, the recess 2120 defined in the first beam 212 allows convenient manipulation by users for rotating the connecting component 300.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An electronic device, comprising:
   a main body;
   a lid rotatably connected to the main body; and
   a connecting component with at least one interface, the at least one interface capable of being hidden by the lid when the lid covers the main body, and exposed when the lid rotates away from the main body;

wherein the connecting component is rotatably connected to the main body, and the connecting component is capable of rotating with respect to the main body until the at least one interface exposes out of the lid when the lid covers the main body; the main body comprises a side part with a receiving space; the connecting component capable of rotating with respect to the side part to switch between a first state and the second state when the lid covers the main body; in the first state, the connecting component received in the receiving space, and the at least one interface hidden by the lid; in the second state, the connecting component rotating out of the receiving space, and the at least one interface being exposed.

2. The electronic device according to claim 1, wherein the lid comprises a first beam, the first beam covering the at least one interface when the connecting component is received in the receiving space.

3. The electronic device according to claim 2, wherein the first beam defines a recess for exerting a force on the connecting component to rotate the connecting component.

4. The electronic device according to claim 1, wherein the lid comprise a first beam, the first beam hiding the at least one interface when the lid covers the main body.

5. The electronic device according to claim 4, wherein the lid comprises a first beam, a second beam, a third beam, and a fourth beam; and the first beam, the third beam, the second beam, and the fourth beam interconnects with each other to form a frame, the lid further comprising a display fastened in the frame; the display comprising a first rim, a second rim, a third rim, and a fourth rim, the first rim, the third rim, the second rim, and the fourth rim are interconnected; the second rim, the third rim and the fourth rim being fastened with the second beam, the third beam, and the fourth beam to fasten the display in the frame.

6. The electronic device according to claim 5, wherein the first beam, the first rim, the third beam, and the fourth beam combines to form an opening; when the lid covers the main body, the connecting component being received in the opening.

7. The electronic device according to claim 6, wherein when the lid rotates away from the main body, the second beam and the display is disposed above the main body, the first beam is disposed below the main body.

8. The electronic device according to claim 7, wherein when the lid rotates away from the main body, the first beam combines with parts of the third beam and the fourth beam under the main body to form a bracket for supporting the main body.

9. An electronic device, comprising:
a main body; and
a lid covering the main body, wherein the lid is capable of switching between a first position and a second position; in the first position, the lid covering the main body; in the second position, the lid rotating away from the main body, and partially disposed below the main body to support the main body; and
a connecting component with at least one interface, the connecting component capable of rotating with respect to the main body to switch between a first state and a second state; in the first state, the at least one interface being hidden under the lid; in the second state, the connecting component rotating away from the main body, and the at least one interface exposing out of the lid.

10. The electronic device according to claim 9, wherein when the lid is in the second position, the at least one interface of the electronic device is exposed.

11. The electronic device according to claim 9, wherein the lid comprises a first beam, a second beam, a third beam, and a fourth beam; and the first beam, the third beam, the second beam, and the fourth beam interconnects with each other to form a frame, the lid further comprising a display fastened in the frame; the display comprising a first rim, a second rim, a third rim, and a fourth rim, the first rim, the third rim, the second rim, and the fourth rim are interconnected; the second rim, the third rim and the fourth rim being fastened with the second beam, the third beam, and the fourth beam to fasten the display in the frame.

12. The electronic device according to claim 11, wherein the first beam, the first rim, the third beam, and the fourth beam combines to form an opening; when the connecting component is in the first state, the connecting component being received in the opening.

13. The electronic device according to claim 12, wherein when the connecting component is in the second state, the connecting component extends out of the opening, thus the at least one interface is exposed.

14. An electronic device, comprising:
a main body; and
a lid comprising a display and a frame sleeved on the display, the lid capable of rotating with respect to the main body to switch between a first state, and a second state; in the first state, the lid covering the main body, and the frame further sleeved on the main body; in the second state, the lid rotating away from the main body until the main body is out of the frame.

15. The electronic device according to claim 14, wherein when the lid in the second state, the lid is partially disposed below the main body to support the main body.

16. The electronic device according to claim 15, wherein the lid comprises a first beam, a second beam, a third beam, and a fourth beam; and the first beam, the third beam, the second beam, and the fourth beam interconnects with each other to form a frame, the lid further comprising a display fastened in the frame; the display comprising a first rim, a second rim, a third rim, and a fourth rim, the first rim, the third rim, the second rim, and the fourth rim are interconnected; the second rim, the third rim and the fourth rim being fastened with the second beam, the third beam, and the fourth beam to fasten the display in the frame; when the lid is in the second state, the second beam and the display is disposed above the main body, the first beam is disposed below the main body.

17. The electronic device according to claim 16, wherein when the lid is in the second state, the first beam combines with parts of the third beam and the fourth beam under the main body to form a bracket for supporting the main body.

* * * * *